United States Patent [19]
Greller et al.

[11] Patent Number: 5,091,038
[45] Date of Patent: Feb. 25, 1992

[54] PLASTIC WELDING MACHINE FOR PRODUCING WELD SEAMS

[75] Inventors: Peter Greller, Enkenbach; Werner Schauss, Bruchmühlbach-Miesau, both of Fed. Rep. of Germany

[73] Assignee: Pfaff Industriemaschinen GmbH, Kaiserslautern, Fed. Rep. of Germany

[21] Appl. No.: 533,594

[22] Filed: Jun. 5, 1990

[30] Foreign Application Priority Data

Jun. 6, 1989 [DE] Fed. Rep. of Germany ....... 3921713

[51] Int. Cl.$^5$ ............... B32B 31/20; B32B 31/26
[52] U.S. Cl. .................... 156/443; 156/204; 156/227; 156/461; 156/463; 156/465
[58] Field of Search ............. 156/443, 461, 463, 465, 156/200, 202, 204, 227, 442.1, 442.4, 574, 391; 270/41; 493/408, 422, 437

[56] References Cited

U.S. PATENT DOCUMENTS

| | | | |
|---|---|---|---|
| 3,617,421 | 11/1971 | Gray | 156/202 X |
| 3,850,775 | 11/1974 | Bruneau et al. | 156/463 |
| 4,272,235 | 6/1981 | Barnett | 156/443 X |
| 4,282,055 | 8/1981 | Bosse et al. | 156/465 X |

Primary Examiner—Michael W. Ball
Assistant Examiner—Michele K. Yoder
Attorney, Agent, or Firm—McGlew & Tuttle

[57] ABSTRACT

A plastic welding machine for producing connection seams with thermal plastic foil or thermal plastic film. The folding device includes a fix support plate and a folding plate which is provided with a U-shaped guide stop and can be pivoted back and forth between a feed position and a working position. Folding device can be folded open for introducing the edge strip of the material to be welded and then folded up where the edge strip is folded over in the shape of a U. A flat U-shaped guide sleeve is provided which may be pivoted into the folding device to produce lap joints on the two layers of the material to be welded.

6 Claims, 3 Drawing Sheets

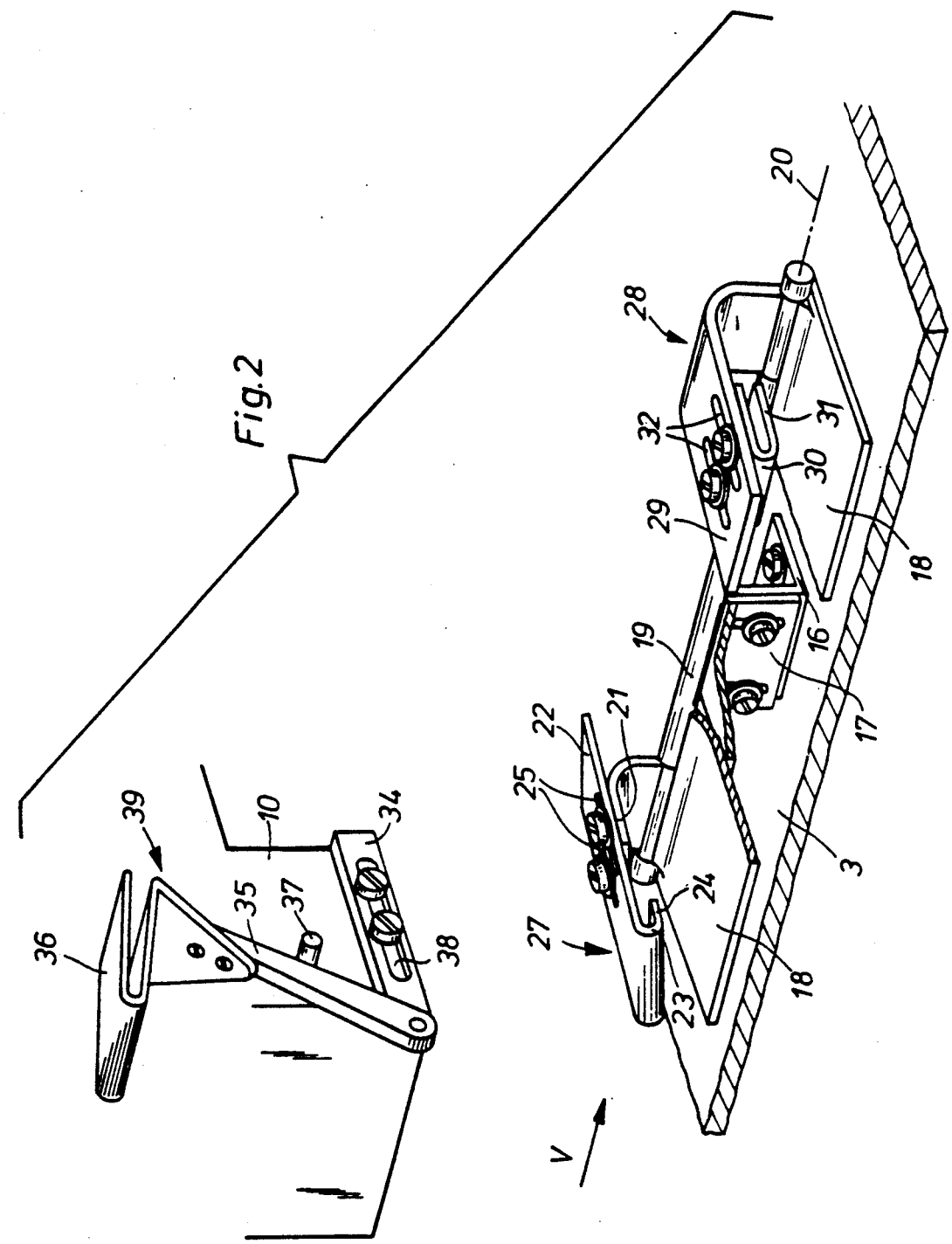

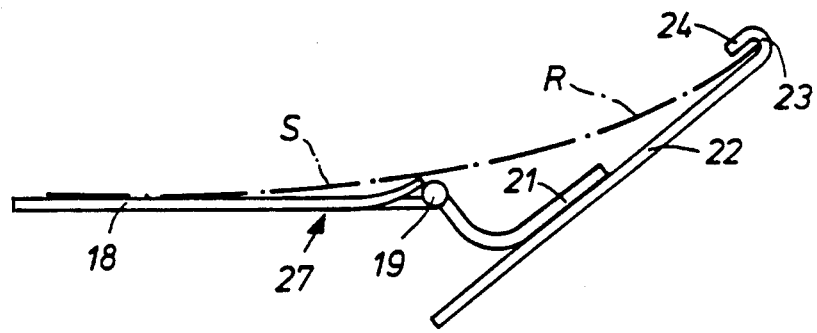
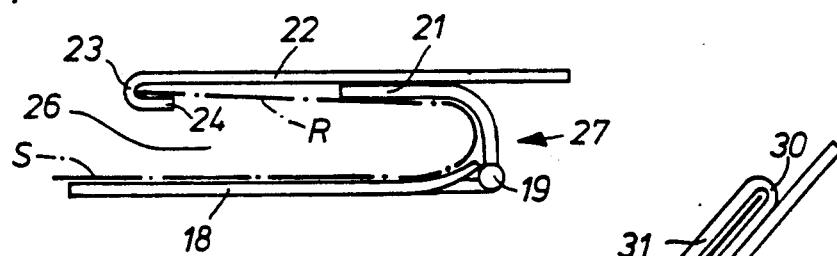
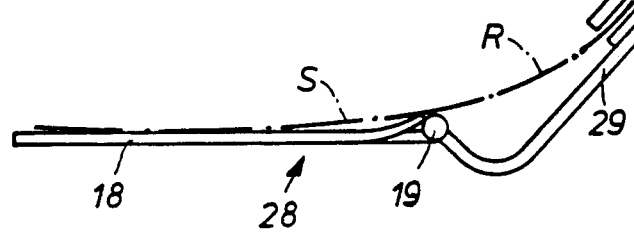
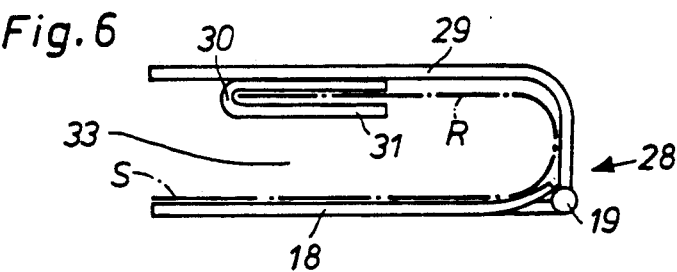
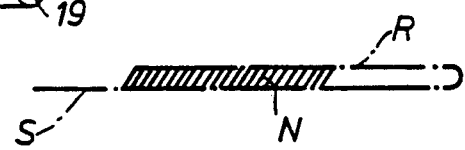
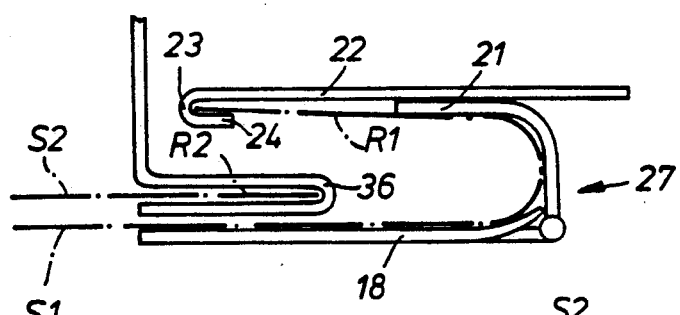

PLASTIC WELDING MACHINE FOR PRODUCING WELD SEAMS

FIELD AND BACKGROUND OF THE INVENTION

The present invention pertains generally to a welding machine for thermoplastic film or foil welding and more particularly to a welding machine for producing connection seams on a material to be welded lying on a support plate with a folding device arranged in front of the welding site for folding over an edge zone of the material to be welded.

West German Patent No. DE-PS 839,754 discloses a plastic welding machine for producing lap joints, in which an edge strip of a lower layer of the material to be welded is folded over the edge of an upper layer of material to be welded by means of a folding device in an overlapping manner.

The folding device has an essentially helical folding sleeve narrowing in the shape of a funnel, into which the front end of the edge strip of the lower layer of the material to be welded must be pushed manually in the prefolded state. Aside from the fact that it is relatively difficult to introduce the end of the edge strip in the case of rigid materials to be welded, and as a consequence of the generally high coefficient of friction of thermoplastics, it is also necessary to ensure that the edge of the folded-over edge strip that extends at right angles to the direction of the seam is exactly flush with the corresponding edge of the layer of material to be welded which is not folded over. Otherwise a weld seam extending in parallel to the side edge cannot be produced.

The same difficulties occur when a border folded over once is formed, because the leading end of the edge strip to be folded over must be introduced into a helical folding sleeve in the same manner as in the case of overlap welding.

SUMMARY AND OBJECTS OF THE INVENTION

It is an object of the present invention to simplify the introduction of an edge strip into a folding device in plastic welding machines.

According to the invention, a welding machine is provided with a folding device including a support plate and a folding plate which can be pivoted at the support plate around an axis extending parallel to the direction of feed of welding machine. A u-shaped guide stop is provided at an end facing away from the axis extending parallel to the direction of feed and the stop may be moved back and forth between a feed position turned away from the support plate, and a working position, located at a spaced position above the support plate. In the working position, the folding plate forms an essentially U-shaped guide slot together with the support plate and the guide stop.

By arranging the folding plate of the folding device, together with the U-shaped guide stop, in such a way that it can be pivoted to and fro between a feed position and a working position, it becomes possible to open the folding device for conveniently introducing the edge strip to be folded over. Additionally, it becomes possible to bring the edge exactly into contact with the side wall of the U-shaped guide stop and to subsequently close it while the edge strip introduced is carried along and folded over. The support plate, the folding plate, and the U-shaped guide stop together assume an approximately helical position and form a matching guide slot for the front zone of the edge strip, which zone is now folded over in the shape of a U.

The guide stop is provided on a separate plate which is adjustably fastened to the folding plate at a right angle to the folding plate pivot axis (the axis which extends substantially parallel to the direction of feed of the welding machine). This makes it possible to vary the width of the edge strip to be folded over. Therefore, it is no longer necessary to have a separate folding device for each desired folding width.

To facilitate the introduction of the edge strip to be folded over into the folding device and to ensure more accurate guiding in parallel to the edges, the folding device is preceded by an auxiliary folding device in which the edge strip to be folded over is prefolded.

A U-shaped guide stop of the folding device and/or auxiliary folding device has an extended leg plate which prevents the folded-over edge strip from slipping out of the guide stop especially if flexible materials are to be welded.

In order to form lap joints on two layers of the material to be welded, a guiding device is provided for introducing the edge zone of a second layer of the material to be welded into the edge zone of the first layer of the material to be welded. The edge zone of the first layer is folded over in the shape of a U. The guiding device has a flat U-shaped guide sleeve arranged on a pivotable bracket. The guide sleeve may be moved back and forth (to and fro) between a resting position, away from the folding device, and a working position, located between the support plate and the folding plate. This makes it possible to use the folding device, designed for forming borders folded over once, also to form lap joints by pivoting in a flat, U-shaped guide sleeve as needed.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

BRIEF DESCRIPTION OF THE DRAWINGS

In the drawings:

FIG. 2 is an enlarged perspective view of the folding device and auxiliary folding device as well as the guiding device;

FIG. 3 is a simplified representation of the folding device in the opened state;

FIG. 4 is a simplified representation of the folding device in the folded-up state;

FIG. 5 is a simplified representation of the auxiliary folding device in the opened state;

FIG. 6 is a simplified representation of the auxiliary folding device in the folded-up state;

FIG. 7 is a schematic representation of a weld seam folded over once;

FIG. 8 is a simplified representation of the folding device with the guiding device swiveled in for a second layer of material to be welded; and FIG. 9 is a schematic representation of a lap joint produced according to the invention.

DETAILED DESCRIPTION OF THE PREFERRED EMBODIMENT

Figure 1:
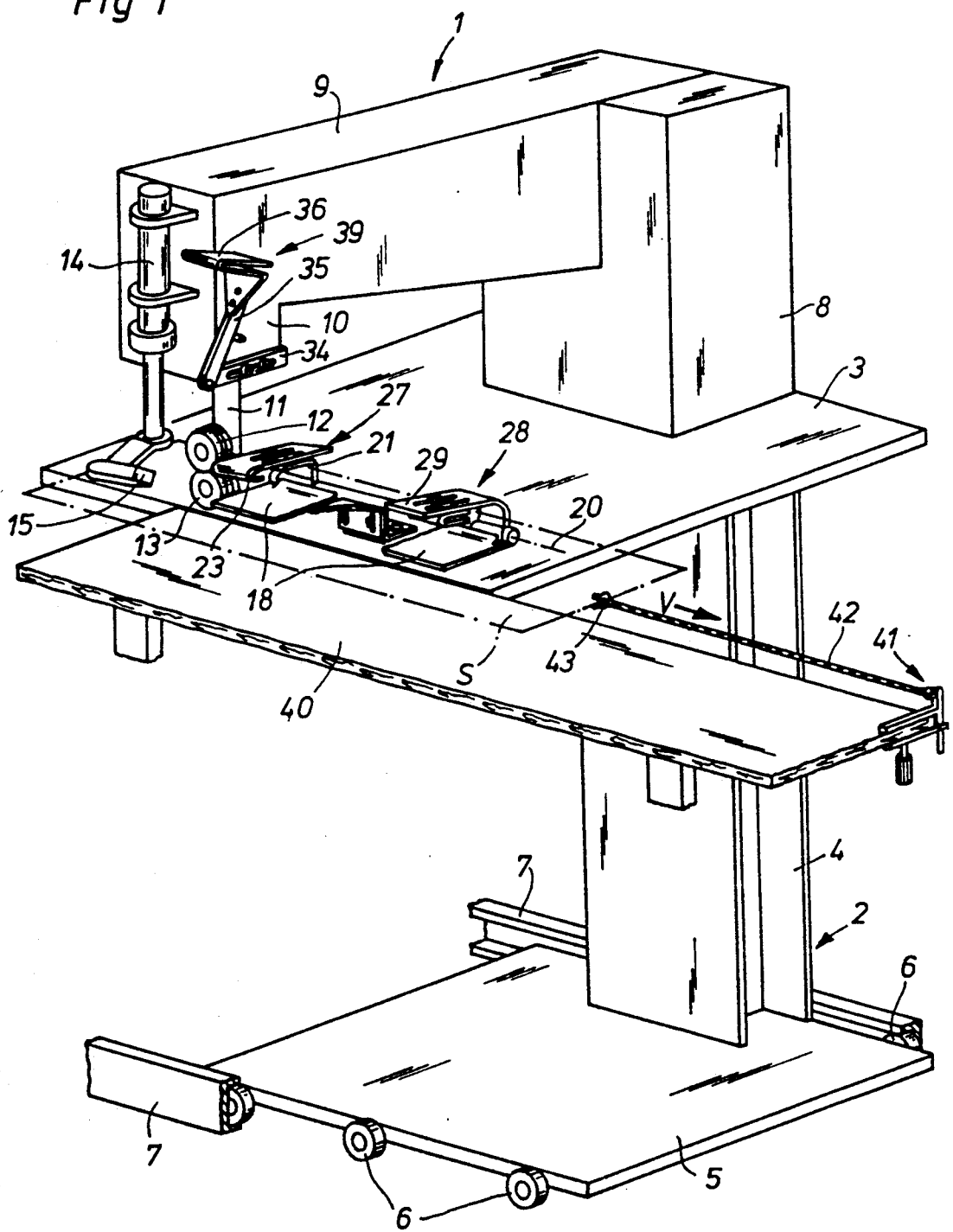
FIG. 1 is a schematic representation of a welding machine with a folding device and an auxiliary folding device, as well as a guiding device for a second layer of material to be welded.

The welding machine 1 shown in FIG. 1 is arranged on a frame 2 which has a table plate 3, a stand 4, and a base plate 5. A plurality of rollers 6, which roll on rails 7 fastened rigidly to the floor, are arranged on two opposite sides of the base plate 5. Two opposite rollers 6 can be driven synchronously by a geared motor (not shown) in the known manner. The welding machine 1 moves on the rails 7 in the direction V along the material to be welded. The material itself, in this preferred embodiment is stationary and first moves through the folding device 28 and 27, then through a heating means and a pressing means.

The housing of the welding machine has a support plate (not shown) located under the table plate 3, a stand 8, and an arm 9, which extends over into a head 10.

A pressing means consisting of an upper, driven pressure roller 12 is arranged on a holder 11 fastened to the head 10, and a lower, driven pressure roller 13 is arranged on a column (not shown). The circumferential velocity of the two pressure rollers 12, 13 is exactly equal to the circumferential velocity of the driven rollers 6. A holder 14, to which an essentially horizontally extending heating means such as a wedge is fastened, is mounted pivotably on the front side of the head 10.

An angle bracket 16, on which an angular holder 17 is arranged, is provided on the table plate 3. A support plate 18 extending in parallel to the table plate 3 is fastened to the holder 17. A hinge 19, whose pivot axis 20 extends in parallel to the direction of movement V of the welding machine 1, is arranged at one of the longitudinal sides of the support plate 18. An essentially L-shaped folding plate 21 is arranged at the hinge 19. A plate 22, having end facing away from the pivot axis 20 has a U-shaped guide stop 23 with a leg 24 extending in parallel to the plate 22 is provided and arranged on the folding plate 21. Oblong holes 25 are provided in the plate 22, as a result of which the plate 22 is adjustable at right angles to the pivot axis 20 and the distance between the guide stop 23 and the pivot axis 20 is thus variable. The folding plate 21 is designed such that in the preparation position shown in FIGS. 1, 2 and 4, a U-shaped guide slot 26 narrowing in the shape of a funnel is formed in the direction of feed between the support plate 18, the folding plate 21, and the guide stop 23. The components 18 through 24 together form a folding device 27.

At a spaced location from the folding device 27, there is an auxiliary folding device 28, which has essentially the same design as the folding device 19, using the correspondingly extended support plate 18 and the hinge 19. An essentially L-shaped folding plate 29 is arranged at the hinge 19. A U-shaped guide stop 30, whose leg 31 extends at a spaced location from and in parallel to the folding plate 29, is arranged at the folding plate 29. Oblong holes 32 are provided in the folding plate 21, as a result of which the guide stop 30 is adjustable at right angles to the pivot axis 20 and the distance of the guide stop 30 from the pivot axis 20 is thus variable. The folding plate 29 is designed such that in the position shown in FIGS. 1, 2 and 6, a U-shaped guide slot 33 narrowing in the shape of a funnel in the direction of feed is formed between the support plate 18, the folding plate 29, and the guide stop 30.

The folding plates 21 and 29 are preferably located in a common plane extending obliquely, relative to the support plate 18, so that the vertical distance measured between the support plate 18 and the folding plate 29 at the outlet of the guide stop 33 is always greater than the vertical distance measured between the support plate 18 and the folding plate 21 at the inlet of the guide stop 26.

A holder 34, on which a bracket 35 is pivotably mounted, is bolted to the head 10. A flat, U-shaped guide sleeve 36 is fastened to the bracket 35. The bracket 35 can be pivoted from the resting position defined by a stop pin 37, which is shown in FIGS. 1 and 2, into a working position, in which the guide sleeve 36, according to FIG. 8, is located between the folding plate 21 and the support plate 18. Due to an oblong hole 38 provided in the holder 34, the latter is adjustable at right angles to the pivot axis 20, and the lateral distance between the guide sleeve 36 located in the working position and the pivot axis 20 is thus variable. The components 34 through 37 form a guiding device 39.

A fixed table 40, which is shown only as a detail in FIG. 1, is provided for depositing a layer S of material to be welded in a stationary position. A tensioning device 41, which has elastic pulling means, which may be formed by a rubber cable 42 and a clamp 43 that can be connected to the layer S of material to be welded, can be clamped onto the table 40.

To place the edge strip R of a layer S of material to be welded, which edge strip is to be folded over to form a border, into the folding device and the auxiliary folding device 27, 28, the folding plates 21 and 29 are pivoted to the feed position shown in FIGS. 3 and 5. As a result of pivot motion the folding device and auxiliary folding device 27, 28 are folded up. In this position, the edge of the edge strip R to be folded over can be pushed into the open, U-shaped guide stops 23, 30 simply and accurately. The folding plates 21, 29, which are linked together via the hinge 19, are now pivoted back into the working position shown in FIGS. 4 and 6, and the edge strip R is folded over in the shape of a U.

After the front zone of the edge strip R has thus been folded over in the shape of a U, the welding machine 1 is moved to the leading edge of the layer S of material to be welded, the heating wedge 15 is pivoted into the working position, and the welding process for joining the folded-over edge strip R to the layer S of material to be welded is started. During welding, the welding machine 1 moves in the direction V together with the folding device and auxiliary folding device 27, 28 relative to the stationarily arranged layer S of material to be welded, which is, e.g., a large, heavy truck tarpaulin. The tensioning device 41 causes the edge strip R not yet grasped by the auxiliary folding device 28 to remain in its original aligned position. This also contributes to the formation of a single-folded border extending exactly in parallel, as is represented schematically in FIG. 7. The weld seam connecting the edge strip R to the layer S of material to be welded is designated by N in the border shown in FIG. 7.

If a lap joint connecting two layers S1, S2 of material to be welded is to be formed instead of a border folded only once, the edge strip R1 of the lower layer S1 of the material to be welded is first placed into the folding device and auxiliary folding device 27, 28 in exactly the same way as in the case of formation of a single-folded border, and folded over in the shape of a U. The guide sleeve 36 is subsequently pivoted into its working position, as shown in FIG. 8, and the edge strip R2 of the second layer S2 of the material to be welded is introduced into the guide sleeve 36. The heating wedge 15 is subsequently pivoted in between the two edge strips R1 and R2, and only the two edge strips R1 and R2 are connected by a weld seam N, as shown in FIG. 9.

While a specific embodiment of the invention has been shown and described in detail to illustrate the application of the principles of the invention, it will be understood that the invention may be embodied otherwise without departing from such principles.

What is claimed is:

1. A welding machine for forming thermoplastic welds and producing connecting seams on a material to be welded comprising: a welding machine body; heating means connected to the welding machine body for movement in a feed direction relative to the material and for continuously forming welds during relative movement of the welding machine body with respect to the material; a folding device including a support plate connected to the welding machine body and a folding plate, said folding plate being connected to said support plate for pivotal movement with respect to said support plate around an axis extending parallel to the direction of feed of the welding machine; a U-shaped guide stop positioned at an end of said folding plate facing away from said pivot axis, said folding plate being moveable back and forth between a preparation position, turned away from said support plate, and a working position, located at a spaced position above said support plate for continuously folding the material during said movement, said folding plate forming an essentially U-shaped guide slot together with said support plate and said guide stop in said working position.

2. A welding machine according to claim 1, wherein said guide stop is provided on a separate plate, said separate plate being adjustably fastened to said folding plate at right angles to said pivot axis.

3. A welding machine according to claim 1, wherein said folding device is preceded with respect to said relative movement of the welding machine to the material by an auxiliary folding device, said auxiliary folding device including an auxiliary folding device support plate, and pivotable with respect to an auxiliary folding device support plate and a U-shaped guide stop at an end facing away from auxiliary folding device pivot axis, said auxiliary folding device folding plate forming an essentially U-shaped guide slot together with said auxiliary folding device support plate and said auxiliary folding device guide stop, a vertical distance of said auxiliary folding device defined at said auxiliary folding device U-shaped guide slot being greater than a vertical distance defined in said folding device U-shaped guide slot.

4. A welding machine according to claim 1, wherein said U-shaped guide stop includes an extended leg for supporting a folded-over edge zone of the material to be welded.

5. A welding machine according to claim 1, wherein a guiding device is provided for forming lap joints on two layers of a material to be welded, said guiding device for introducing an edge zone of a second layer of a material to be welded into an edge zone of a first layer of a material to be welded, the edge zone of the first layer of the material to be welded is folded over in the shape of a U, said guiding device including a U-shaped guide sleeve arranged on a pivotable bracket, said guide sleeve being moveable back and forth between a resting position, away from the folding device and a working position, located between said folding device support plate and folding plate.

6. A welding machine for forming a seam in material, the welding machine comprising:
 a frame moveable relative to the material and in a direction substantially similar to the direction of the seam;
 a support plate mounted on said frame;
 a folding plate pivotally mounted on said support plate;
 a U-shaped guide stop on said folding plate for stopping the material in a direction substantially perpendicular to the seam and continuously guiding the material in a direction substantially parallel to the seam during relative movement of said frame with respect to the material, said folding plate being moveable into a preparation position for inserting the material into said U-shaped guide stop in preparation for folding the material and forming the seam, said folding plate being moveable into a working position for initially folding a section of the material and for continuously folding additional material during said relative movement of said frame with respect to the material;
 a heating means attached to said frame for continuously heating the material to be formed into a seam during said relative movement; and
 pressing means for pressing the material together to continuously form a seam during said relative movement.

* * * * *